Oct. 6, 1964 SHINKICHI YANO 3,151,631
PIPE COUPLING HAVING A SPLIT RING SEALING
MEANS FOR WATERWORKS AND THE LIKE
Filed July 6, 1962 6 Sheets-Sheet 4
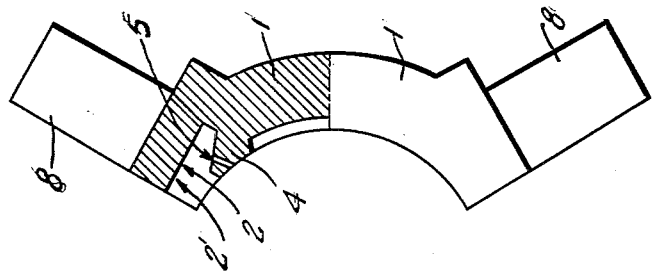
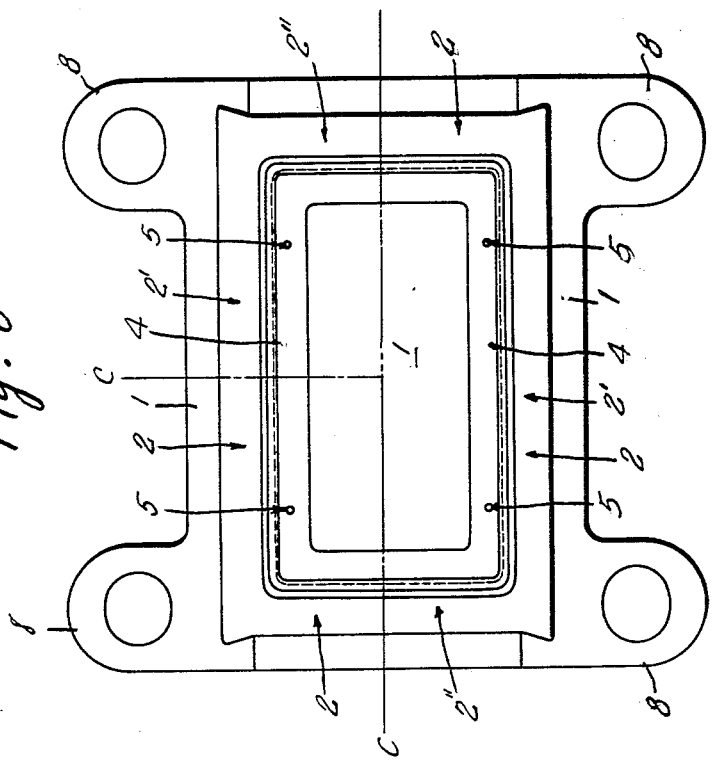
INVENTOR.
SHINKICHI YANO,
BY United States Patent Office 3,151,631
Patented Oct. 6, 1964

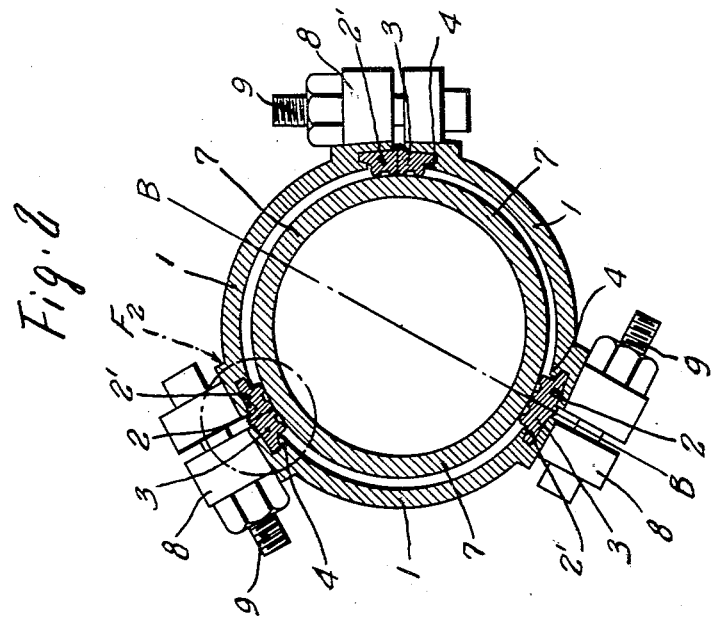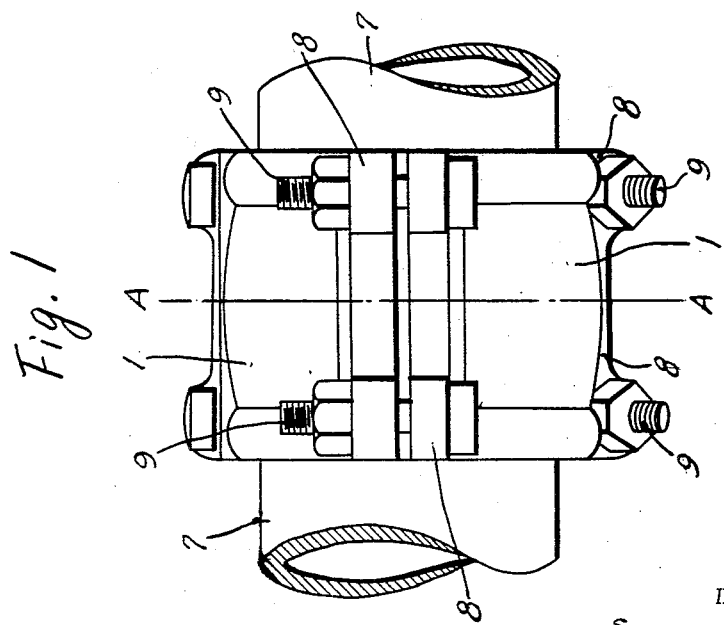

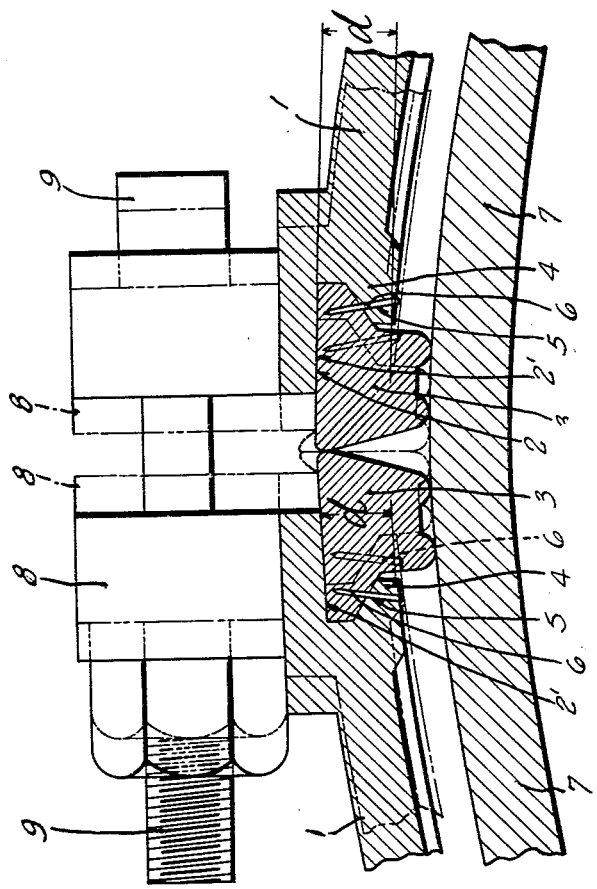

3,151,631
PIPE COUPLING HAVING A SPLIT RING SEALING MEANS FOR WATERWORKS AND THE LIKE
Shinkichi Yano, 137–1 7-chome, Sakurazuka-Hondori, Toyonaka-shi, Japan
Filed July 6, 1962, Ser. No. 207,934
4 Claims. (Cl. 138—97)

This invention relates to an improvement in the pipe coupling having a split ring leak-preventing means for waterworks and the like which may spring a leak or leaks of liquid or gas due to a partial damage on the pipe, and which may be branched off with a T-shaped split pipe. An object of the invention is to provide a pipe coupling having a split ring composed of 3 or more sections, said ring having a circumferential groove of a uniform depth on the edges of said ring, a circular gasket of a uniform section to be fitted into each of said circular grooves, a suitable number of holes in communication with a groove with one of the edges opened to one side, and pins being inserted into said holes to fix said gasket, with a circular gasket being fitted into said circular groove, thus said split ring composed of 3 or more sections being fastened to the outer surface of said pipe.

The invention will be more fully explained and additional objects and advantages will become apparent with reference to the accompanying drawing, illustrating a preferred embodiment, but it is to be understood that the drawing is not intended to limit the invention as it is merely illustrative of the principle involved. Other specific forms of construction will occur to persons skilled in the art and all such modifications within scope of the appended claims are included in the invention.

In the drawing,

FIGURE 1 is a front view of a preferred embodiment of the invention illustrating the details of the pipe provided with a leak-preventing coupling.

FIGURE 2 is a cross-sectional view of the invention taken along section A—A of FIGURE 1.

FIGURE 5 is an enlarged fragmentary cross-sectional view of $F_2$ illustrated in FIGURE 2.

FIGURE 6 is a plan view of the invention showing the construction of the split ring.

FIGURE 7 is a fragmentary cross-sectional view of the invention showing the split ring taken along section C—C of FIGURE 6.

Figure 3:
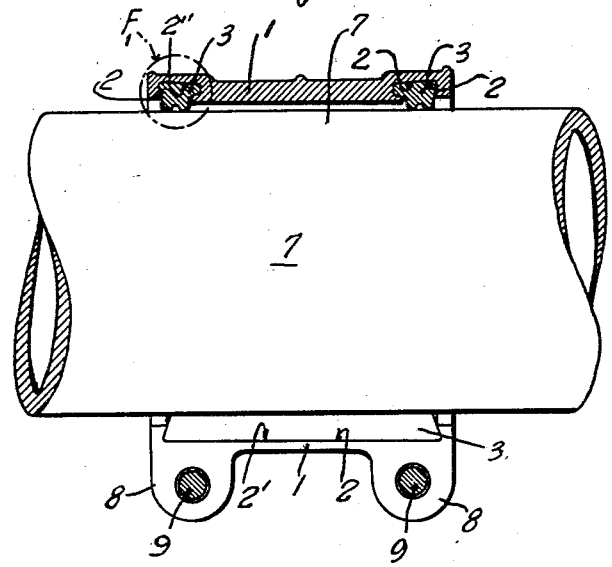
FIGURE 3 is a fragmentary cross sectional view of the invention taken along section B—B of FIGURE 2.
Figure 4:
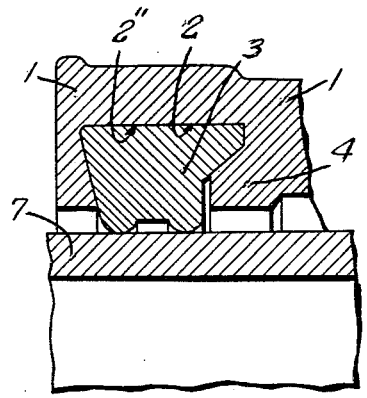
FIGURE 4 is an enlarged fragmentary cross-sectional view of $F_1$ illustrated in FIGURE 3.
Figure 8:
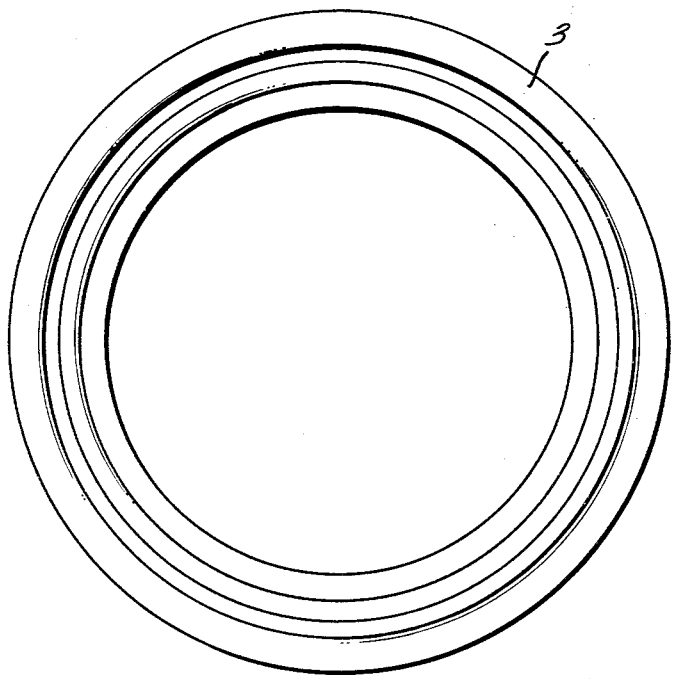
FIGURE 8 is a plan view showing the gasket.
Figure 9:
FIGURE 9 is a fragmentary cross-sectional view showing the gasket illustrated in FIGURE 8.

The circular groove 2 is engraved, at a uniform depth along the inner edge of the split ring 1 with its four corners rounded as illustrated in FIGURE 6. The groove 2″ which is formed along the circumferential surface of the inner split ring 1 of the circular groove is made completely a ditch as illustrated in FIGURE 3, and FIGURE 4, and the groove 2′ which is formed along the axial line of pipe 7 is not a complete one but an open one sided as illustrated in FIGURE 2, FIGURE 5, and FIGURE 7. The sectional shape of the circular groove 2 is as illustrated in FIGURE 4, and FIGURE 5, i.e., the groove 2″ which is formed along the circumferential surface of the pipe 7 is made slightly wider on both sides at the bottom than the opened part and a flange 4 is made especially inside of the same. The other groove 2′ which is formed along the axial line of the pipe 7 is made with its outside opened and provided with a flange 4 only inside of the same. The gasket 3 is made in a circular shape as illustrated in FIGURE 8 and FIGURE 9, and on the part of the section which is touching the bottom of the circular groove 2 is shaped slightly opened towards the end, and is made a uniformed section around. The gasket 3 is made of a soft elastic material such as rubber, which is freely transformable when applying; be sure to put all split rings 1 tightly into the circular groove 2. In this case, the gasket 3 is tightly fitted into the complete groove 2″ which is formed along the circumferential surface due to the effect of the end opening shaped groove as illustrated in FIGURE 4. However, the edge of the groove 2 which is formed in parallel with the axial line of the pipe 7 is made opened and will split out readily as illustrated in FIGURE 5, so it is necessary to insert pin 6 into the small holes 5 which are made on the flange 4 of the open one sided groove in order to prevent the gasket from splitting out by means of the same as illustrated in FIGURE 5.

Now on checking leaks on the pipe 7 so as to prevent them by means of the leak-proof split coupling embodied by this invention, it is advisable to put the split ring 1 around the pipe 7 on the leaking spot and then tighten screw rod 9 of the clamp 8 on the respective spot against the pipe 7. By so doing, the rubber gasket 3 of each split ring 1 will enclose the damaged part of the pipe 7, and the interior of the split ring 1 will cover the damage to ensure a complete check of liquid or gas leak.

Figure 10:
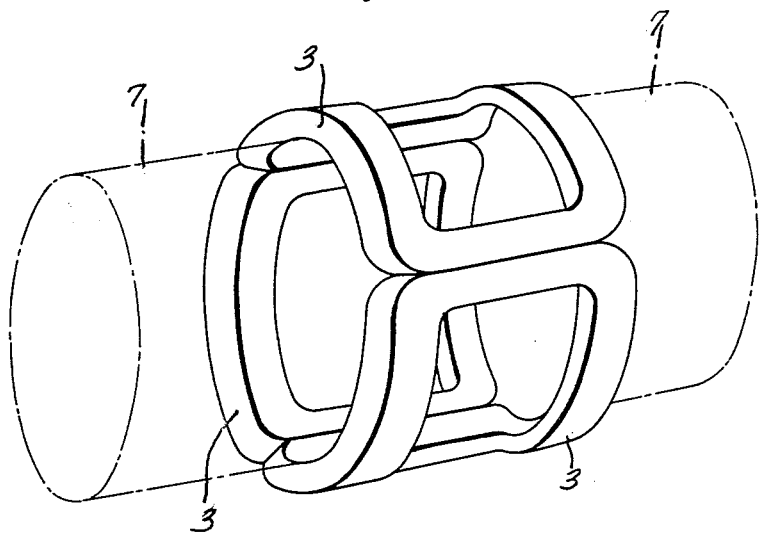
FIGURE 10 is an isometric detailed view showing the leak-preventing arrangement on the pipe.

This invention enables the same shaped gasket 3 to fit the split ring of the pipes of any size. The circular gasket 3 has a fixed circumference which will easily conform to any shape of the rectangular frame to be formed by the circular groove 2 of each split ring 1, in other words, for a pipe of larger diameter, the circular gasket 3 can be fitted in the circular groove 2 of each split ring 1 by making the length of the circular groove 2 of the respective ring longer than its width in order to regulate the circumference of the circular groove 2 and that of the gasket 3 so as to prevent any leakage when using different pipes. For a pipe of smaller diameter, the same result can be obtained, as mentioned above, by making the length of the frame shorter than its width, which is to be formed by the circular groove 2. A conventional leakproof split coupling usually has inside of each split ring, two grooves running along the exterior of the pipe, and also a framed gasket fitted tightly to the grooves respectively in case of such framed gasket, only the gasket $a$ which is running along the exterior of the pipe as illustrated in FIGURE 10 will work to check the leaks, while the gasket $b$ which is crossing the gasket $a$ is designed simply to link the two pieces of the gasket $a$ with each other. Therefore, leaks on the pipe can only be checked by means of a set of split rings $c$; however, the inner circumferential surface of the split rings will be filled with those liquids or gases leaking through the damaged part of the gasket. As the framed gasket is rather delicate and complicated, the conventional framed gasket should be made more suitable to different size of those cast iron water pipes, otherwise, it will complicate the manufacturing techniques and also cause inconveniences in handling of the same; moreover, the gasket will become costly.

The above-mentioned defects of the conventional leak-proof split coupling have been improved by this invention as follows:

The circular groove 2 with a uniform shape is designed to be made on the interior of the split ring 1 and the same sectional shaped circular gasket 3 is designed to fit into the said circular groove 2. The split rings 1 are designed and manufactured in a suitable size, and also the length of the circular groove 2 is made to have the same circumference as the circular gasket 3. Therefore, a good result can be obtained with pipes of different diameters by means of the same sectional-shaped gasket 3; moreover, the gasket of this kind is available at a reasonable price, because the uniformity of its shape and also the mass production have become feasible. The sectional shape of the circular groove 2 in the split ring 1 is designed to open towards the end, and the gasket is also to be made in such a sectional shape so as to fit into the groove that way in order to prevent the circular gasket 3 constantly from splitting out of the groove. To fix the gasket 3 in the open one sided groove 2', a pin 6 is provided to be inserted into a suitable number of holes 5 on the flange 4 of the said open one sided groove 2' of the circular groove 2, thereby to preventing the gasket 3 from splitting out of the circular groove 2 and making it easier for handling of the same.

Figure 11:
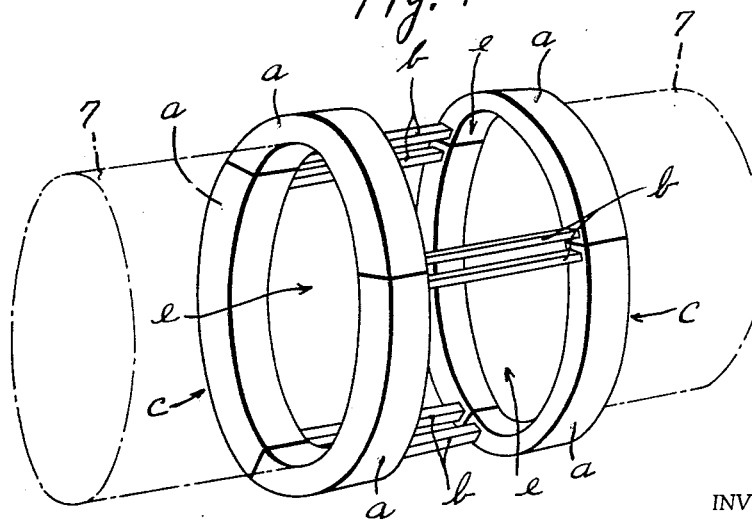
FIGURE 11 is an isometric view showing a conventional arrangement on the pipe.

The entire surface of the circular groove 3 in the interior of each split ring 1 has been designed by this invention, to be pressed tightly to the surface of the pipe. Therefore, it will be enough to check any leaks on the surface of the pipe with 3 pieces of the gasket 3 as illustrated in FIGURE 11, ensuring no gas or liquid leakage even if there is a gap on any parts other than the gasket.

Having thus described this invention in such full, clear, concise and exact terms as to enable any person skilled in the art to which it pertains to make and use the same, and having set forth the best mode contemplated of carrying out this invention, I state that the subject matter which I regard as being my invention is particularly pointed out and distinctly claimed in what is claimed, it being understood that equivalent or modifications of, or substitutions for, parts of the above specifically described embodiment of the invention may be made without departing from the scope of the invention as set forth in what is claimed.

What is claimed is:

1. A pipe coupling having a split ring sealing means for waterworks and the like, comprising a split ring composed of 3 or more sections, said ring having a circumferential groove of a uniform depth on the edges of said ring, a circular gasket of a uniform section to be fitted into each of said circular grooves, a suitable number of holes in communication with one of edges opened to one side, and pins being inserted into said holes to fix said gasket, with a circular gasket being fitted into said circular groove, thus said split ring composed of 3 or more sections being fastened to the outer surface of said pipe.

2. A pipe coupling, comprising, in combination:
a pipe;
a split sleeve encircling said pipe and including a plurality of sections separated from each other in the circumferential direction, each section having a groove in the inner surface thereof, said groove defining a closed loop adjacent the periphery of said inner surface, said groove having portions opening toward the place of separation between adjacent sections, all of said grooves being of the same depth and widened near their bottoms;
a packing ring of a resilient material in each groove and each being shaped uniformly throughout its length and having a cross section which is widened at the bottom portion which bears against the groove bottom, each packing ring projecting out of the groove in which it is disposed for a sufficient distance to engage said pipe and the portions of the rings disposed in said groove portions being in contact with each other;
pin means for holding each packing ring in the groove of a respective section; and
means for clamping said sections together about said pipe for urging adjacent rings into sealing contact with each other and with said pipe.

3. A coupling as defined in claim 2 wherein there are three sections.

4. A set of pipe couplings, comprising:
a set of split rings of different circumferential size for encircling pipes of different diameters and each including a plurality of sections separated from each other in the circumferential direction, each section having a groove in the inner surface thereof, said groove defining a closed loop adjacent the edges of said inner surface, all of said grooves being of the same depth and being widened at their bottoms, all of said grooves being of the same length;
a packing ring of a resilient material in each groove and being shaped uniformly throughout its length and having a cross section which is widened at the bottom portion which bears against the groove bottom, each packing ring projecting outwardly from the groove in which it is seated and all of said packing rings being of the same length;
pin means for holding each packing ring in the groove of a respective section; and
means on each split ring for clamping its sections together about a pipe to urge adjacent rings into sealing contact with each other.

References Cited in the file of this patent

UNITED STATES PATENTS

| 2,230,289 | Curtis | Feb. 4, 1941 |

FOREIGN PATENTS

| 413,090 | Italy | Mar. 27, 1946 |
| 740,433 | Great Britain | Nov. 9, 1955 |
| 790,109 | Great Britain | Feb. 5, 1958 |